United States Patent
Menzel et al.

(10) Patent No.: US 9,197,452 B2
(45) Date of Patent: Nov. 24, 2015

(54) METHOD FOR ADAPTIVE CHANNEL ESTIMATION FOR WIRELESS COMMUNICATION BETWEEN A VEHICLE AND OTHER COMMUNICATION SUBSCRIBERS USING THE MEASUREMENT RESULTS OF THE ENVIRONMENT SENSOR SYSTEM

(75) Inventors: Marc Menzel, Weimar (DE); Ulrich Stählin, Eschborn (DE)

(73) Assignee: Continental Automotive GmbH, Hannover (DE)

( * ) Notice: Subject to any disclaimer, the term of this patent is extended or adjusted under 35 U.S.C. 154(b) by 2 days.

(21) Appl. No.: 14/112,501

(22) PCT Filed: Mar. 7, 2012

(86) PCT No.: PCT/EP2012/053920
§ 371 (c)(1),
(2), (4) Date: Oct. 17, 2013

(87) PCT Pub. No.: WO2012/143170
PCT Pub. Date: Oct. 26, 2012

(65) Prior Publication Data
US 2014/0044212 A1 Feb. 13, 2014

(30) Foreign Application Priority Data
Apr. 18, 2011 (DE) .......................... 10 2011 017 474

(51) Int. Cl.
H04L 27/06 (2006.01)
H04L 25/02 (2006.01)
H04B 5/00 (2006.01)
H04B 17/309 (2015.01)
H04B 17/391 (2015.01)

(52) U.S. Cl.
CPC .......... *H04L 25/0202* (2013.01); *H04B 5/0043* (2013.01); *H04B 17/309* (2015.01); *H04B 17/391* (2015.01); *H04L 25/0216* (2013.01); *H04L 25/0222* (2013.01)

(58) Field of Classification Search
CPC .............. G06F 15/16; G06F 17/30277; G06F 2221/2111; H04L 51/10; G06Q 30/0261; G06T 5/009
USPC ................................... 375/224, 340
See application file for complete search history.

(56) References Cited

U.S. PATENT DOCUMENTS 6,349,119 B1 * 2/2002 Sogabe et al. ................ 375/316
7,012,955 B2 3/2006 Lee et al.
(Continued)

FOREIGN PATENT DOCUMENTS

EP 0 878 921 A1 11/1998

OTHER PUBLICATIONS

Johan Karedal, Fredrik Tufvesson, Nicolai Czink, Alexander Paier, Charlotte Dumard, Thomas Zemen, Christoph F. Mecklenbräuker, Andreas F. Molisch; "A Geometry-Based Stochastic MIMO Model for Vehicle-to-Vehicle Communications"; IEEE Transactions of Wireless Communications, vol. 8, No. 7, Jul. 1, 2009, pp. 3646-3657, XP011264139, ISSN: 1536-1276.
(Continued)

*Primary Examiner* — Don N Vo
(74) *Attorney, Agent, or Firm* — Cozen O'Connor

(57) ABSTRACT

Channel estimation for wireless communication between a motor vehicle and another communication subscriber is provided, such that, the result from an environment sensor system is used in the channel estimation. Using the environment sensor system, the propagation behavior of the wireless communication in the vicinity of the motor vehicle is recognized and classified, the channel estimation being adapted on the basis of the classification of the propagation behavior.

10 Claims, 2 Drawing Sheets

(56) References Cited

U.S. PATENT DOCUMENTS

| | | | | |
|---|---|---|---|---|
| 2004/0203725 | A1* | 10/2004 | Lahav et al. | 455/423 |
| 2009/0245333 | A1 | 10/2009 | Krishnamoorthi et al. | |
| 2010/0080178 | A1* | 4/2010 | Cox et al. | 370/329 |
| 2010/0215081 | A1 | 8/2010 | Bajwa et al. | |
| 2011/0317748 | A1* | 12/2011 | Li et al. | 375/219 |
| 2013/0010713 | A1* | 1/2013 | Folke et al. | 370/329 |

OTHER PUBLICATIONS

Andreas F. Molisch, Fredrik Tufvesson, Johan Karedal, Christoph F. Mecklenbräuker; "A Survey on Vehicle-to-Vehicle Propagaton Channels"; IEEE Wireless Communications, vol. 16, No. 6; pp. 12-22, Dec. 1, 2009; XP011286587; ISSN: 1536-1284.

Rabindranath Bera, Sourav Dhar, D. Kandar, N.B. Sinha, Manojit Mitra; "Modeling and Implementation of Wireless Embedded System for Intelligent Transport System Application";pp. 1-6; IEEE Region 10 and the Third International Conference on Industrial and Information Systems—ICIIS 2008, Kharagpur, India, Dec. 8-10, 2008; XP031435520; ISBN 978-1-4244-2806-9.

Stefan Lindenmeier, Konrad Boehm, Johann F. Luy; „A Wireless Data Link for Mobile Applications; IEEE Microwave and Wireless Components Letters; vol. 13, No. 8; pp. 326-328; XP011427829; ISSN: 1531-1309.

* cited by examiner

METHOD FOR ADAPTIVE CHANNEL ESTIMATION FOR WIRELESS COMMUNICATION BETWEEN A VEHICLE AND OTHER COMMUNICATION SUBSCRIBERS USING THE MEASUREMENT RESULTS OF THE ENVIRONMENT SENSOR SYSTEM

CROSS-REFERENCE TO RELATED APPLICATIONS

This is a U.S. national stage of application No. PCT/EP2012/053920, filed on 7 Mar. 2012, which claims priority to the German Application No.: 10 2011 017 474.5, filed: 18 Apr. 2011, the content of both incorporated herein by reference.

BACKGROUND OF THE INVENTION

1. Field of the Invention

The invention relates to a method for channel estimation for wireless communication between a motor vehicle and another communication partner which can be a mobile communication partner or a stationary one. In the channel estimation, the result of an environment sensor system is also used.

2. Prior Art

In a digital transmission system, the data to be transmitted are initially modulated digitally. This is also called symbol mapping. In a pulse shaping filter, a continuous-time baseband signal is subsequently generated. Before the signal can be transmitted via the actual transmission channel, the baseband signal is transformed into a so-called bandpass signal, for example by means of a quadrature modulator.

At the receiver end, the received signal is transformed back into a baseband signal via a corresponding quadrature demodulator, wherein this retransformation can be followed by certain error correction mechanisms.

The transmission channel is determined by the physical communication characteristics of the system. In this context, the transmitted signal can be adapted to the characteristics of the transmission channel by a suitable choice of transmission and modulation methods in order to achieve the most optimal transmission possible. At the receiver end, a so-called channel estimation is performed in order to be able to compensate for distortions occurring due to the transmission channel. For this purpose, reference signals are frequently inserted into the data stream at the transmitter from which the receiver can derive information about the channel transmission function. The channel transmission function can be estimated on the basis of this information.

In this context, the known channel estimation methods generate a model of the environment wherein only information from the communication itself has normally been used hitherto. However, this is problematic for wireless communication with the outside world when a communication partner, for example a motor vehicle, is moving at high speed and, as a result, the environmental conditions change rapidly. This also leads to rapidly changing propagation characteristics of the wireless or radio communication.

In a motor vehicle, a multiplicity of options are known as wireless communication systems with the outside world. By means of a vehicle-to-infrastructure or vehicle-to-vehicle communication (C2X), the systems can increase the safety of the vehicle, improve mobility, and can also be used for commercial applications. Communication technologies considered here are particularly cellular communication systems, such as GPRS, EDGE, UMTS, LTE, WiMax, automotive WLAN according to the IEEE 802.11p standard, or RKE (remote keyless entry). These technologies also enable Internet access or wireless driving authorization to be implemented.

U.S. Pat. No. 6,349,119 B1 shows a method for channel estimation that estimates the characteristics of the channel between a transmitter and a receiver with high accuracy using geometric models of the channel, recognizes the position of the transmitting antennas using the geometric information, which is based on the model, and estimates the path between the transmitter and the receiver. In the case of a vehicle, the geometric information is acquired by a camera.

However, a problem with such a system is that the transmitting antennas are frequently detected only with difficulty by the cameras and elaborate image processing must be carried out in order to actually determine the positions of the cameras from the recorded image data. The method is, therefore, very elaborate and computationally intensive and will frequently not lead to satisfactory results, especially at high vehicle speeds because the evaluation of the antenna position takes too long and the relative position between transmitter and receiver has changed again by the time the transmitter position is determined.

SUMMARY OF THE INVENTION

It is the object of the present invention, therefore, to propose a method for channel estimation in which the inclusion of the environment sensor system is simplified for the channel estimation.

According to an aspect of the invention, this object is achieved by a method in which, using the environment sensor system, first the propagation characteristic of the wireless communication in the vicinity of the motor vehicle is detected and classified, and the channel estimation is adapted on the basis of the classification of the propagation characteristic.

It is thus sufficient for this purpose to detect, using the environment sensor system, typical environmental conditions of the receiver in the motor vehicle from which conclusions can be drawn with respect to the transmission channel and possible disturbances in the transmission channel. This information is unified by a classification which then provides for a suitable adaptation of the channel estimation. In comparison with the embodiment described in U.S. Pat. No. 6,349,119 B1, according to which a detailed evaluation of the environment must be carried out by a camera environment sensor system, it is sufficient, according to the invention, to detect suitable features of the environment that are relevant to the propagation of the wireless communication, and then to use these detected features also in the channel estimation. This creates a simple system, which also acts rapidly at high speeds, for improving the channel estimation so that, in spite of the environmental features generalized by means of the classification, considerable improvement of the transmission quality can be achieved in the wireless communication.

In accordance with an aspect of the present invention, it is provided that, for the classification of the propagation characteristic, one class is selected from a multiplicity of predefined classifications.

Preferably, certain typical transmission patterns are allocated to such a class from the classification. The predefined classifications can thus include, especially, classes such as: city, country lane, freeway, street canyon, hilly environment, open area, tunnel or the like.

According to one aspect of the invention, the channel estimation can be performed again or restarted in the case of a change of the classification, for example by a reset of the channel estimation and a redetermination of the data needed. According to one aspect, the repeated carrying out of a channel estimation can be restricted to certain transitions in the classification, for example, cases involving a change between different classes of the classification which are typically associated with significant changes in the transmission characteristic in the transmission channel. One example of such a change is driving from an open landscape into a city having high house fronts at which the transmission signals are reflected and deflected.

According to another aspect of the invention, it is possible to achieve the adaptation of the channel estimation by selecting a model for the channel estimation on the basis of the classification of the propagation characteristic, various models being differently suited to different classifications due to the physical situation.

In another aspect, additionally or alternatively, an adaptation of the channel estimation can be achieved on the basis of the classification of the propagation characteristic and/or of further information of the environment sensor system using adaptation of parameters in the channel estimation. In this way, the quality of the channel estimation within a model can be achieved by adaptation of parameters to the actual environmental features of the motor vehicle.

In another aspect, a factor of forgetting, an intensity of reflection, the vehicle speed, the attenuation, the shading and/or other characteristics of the environment and/or of the communication are considered as parameters.

The factor of forgetting specifies how quickly the past is forgotten in the case of a change of the environment. Thus, the past is usually forgotten quickly if the environment changes quickly and forgotten slowly if no great changes occur. The vehicle speed can also be a measure of this. The intensity of reflection specifies how strongly the radio signals are reflected, for example, at house fronts within a city in order to be able to better detect interference due to the reflections. A suitable environment sensor system can be a tachometer for the speed of the vehicle, a camera, particularly for detecting changes in the characteristics of the landscape, and a corresponding image detection method and radar, lidar and/or laser sensors for measuring the reflection characteristic of the environment. During the measurement of the reflection characteristic, the sensors described above can radiate signals and measure the speed and intensity of a reflection in order to estimate the overall reflection characteristic in the vicinity of the motor vehicle and to take it into consideration in the adaptation of the channel estimation.

Attenuation describes how much the radio signals are attenuated by the environment. This information can be determined mainly from a camera (for, e.g., the effects of fog, forest, etc.) and/or radar sensors (via their range). It is a similar case with shading, which leads to an abrupt shortening of the range of communication, and is a local, abrupt strong attenuation.

The environment sensor system covers preferably the environment in front of the vehicle in the direction of motion of the motor vehicle because this is decisive for the future quality of reception. By using the method for influencing the channel estimation, the detected environment is then thus classified with respect to the propagation characteristic in an area through which the vehicle will move within a short time.

Depending on the situation, however, other areas around the vehicle can also be covered, for example the rear area, if the vehicle is moving backward or intends to change its track, or the lateral area, if the vehicle intends to divert or a hazard threatens it from the side.

One use of the method described above that is particularly preferred according to the invention is available in a wireless communication designed as short range radio, especially an automotive WLAN according to the IEEE 802.11/p standard.

According to another aspect of the invention, the method according to the invention for channel estimation can be performed in a computing unit of a functional communication unit of the motor vehicle, preferably the functional unit of a motor vehicle for mobile communication.

According to another aspect, the present invention relates to a functional unit of a motor vehicle comprising a transmitting and receiving device for wireless communication, a connection to a vehicle communication network for receiving information of an environment sensor system of the motor vehicle and a computing unit, the computing unit being configured for performing the previously described method or parts thereof, according to the invention.

In another aspect, the functional unit or an arbitrary computing unit can also be configured by a computer program product, e.g., stored on a non-transitory computer-readable medium, according to the invention, for performing a channel estimation during a wireless communication between a motor vehicle and another communication partner comprising program code for executing a computer program after its implementation in a computing unit, the program being provided for executing the previously described method or parts thereof after the implementation in the computing unit.

Further advantages, features and possible applications of the present invention are also obtained from the subsequent description of an exemplary embodiment and the drawings. In this context, all features described and/or presented pictorially by themselves or in arbitrary combination form the subject matter of the present invention, also independently of their combined representation in the claims or their references.

DETAILED DESCRIPTION OF THE PRESENTLY PREFERRED EMBODIMENTS

Figure 1:
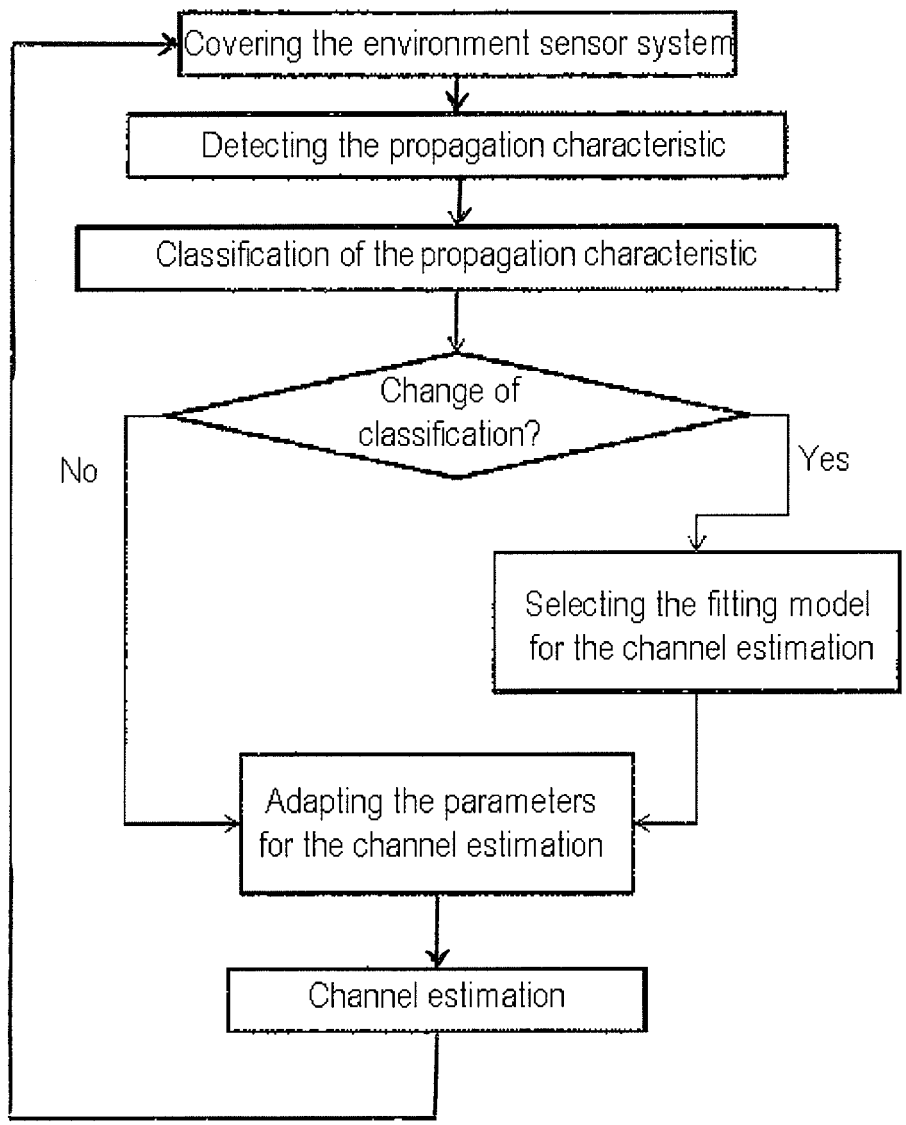
FIG. 1 is a flow chart of the method according to the invention which can be implemented in the computing unit of a functional unit of the motor vehicle or can be implemented by program code means of a computer program product in a computing unit.
Figure 2:
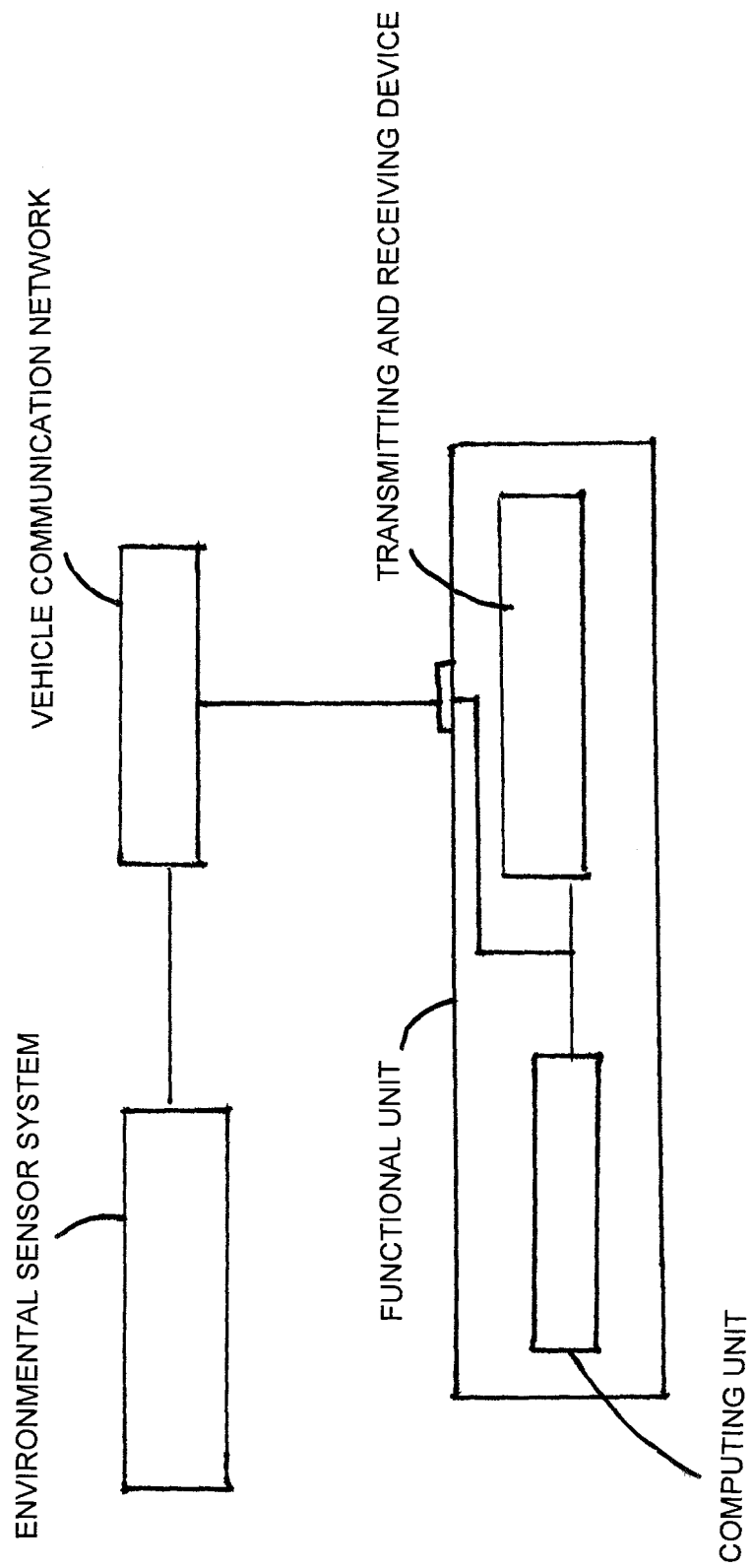
FIG. 2 is a diagram of a system including the functional unit.

As part of normal channel estimation in wireless communication between a motor vehicle and another communication partner, which can be a stationary communication partner or also a mobile one, with reference to the flowchart of FIG. 1, the environment sensor system is initially covered in the beginning. For this purpose, signals of the environment sensor system of the motor vehicle are evaluated. The environment sensor system can be simply a camera directed, for example, in the direction of driving of the motor vehicle by which the environment of the vehicle is picked up and by image recognition it is detected that particular environments are classifiable. This means, for example, that image processing rapidly recognizes whether the vehicle is in an open environment, in an environment bounded by plants (forest, bushes or the like) or in a built-up environment, wherein the height of the building-up can also be estimated or evaluated without great expenditure in a built-up environment. Further, radar, lidar or laser sensors can be used that emit radiation from the vehicle and detect the reflected radiation in order to test the propagation of electromagnetic waves in the environment of the vehicle.

From the information detected by the environment sensor system, the propagation characteristic of the wireless communication, that is to say of the electromagnetic waves exchanged in the context of the wireless communication, can then be assessed in the vicinity of the motor vehicle. The detection and assessment of the propagation characteristic is followed by classification of the propagation characteristic, certain features detected by means of the environment sensor system being allocated various characteristics in the propagation of the electromagnetic waves of the wireless communication by the various classes of the classification.

Optionally, but meaningfully within the context of a preferred embodiment of the invention, it is possible to check whether the classification has changed since the last classification of the propagation characteristic. If this is so, it may be meaningful, depending upon the transition from a particular first class into a particular second class, to reset the entire channel estimation in order to adapt the channel estimation to the changed environmental conditions.

If a change has taken place in the classification, a new model fitting the changed classification is selected for the channel estimation, the model depending on the classification. If not, the same model continues to be used.

Following this, parameters for the channel estimation can be adapted in dependence on the classification and/or further information from the environment sensor system. In this context, objects having multi-path propagation can also be detected and taken into consideration in the model parameters of the channel estimation.

Once both the model and possibly the parameters for the channel estimation have been selected, the channel estimation is performed which optimizes the reception in the wireless communication. After the channel estimation has been performed, the covering of the environment sensor system is restarted in order to find possible changes in the environment of the vehicle.

In this process, a predefined pause can be made, according to the invention, between the performance of the last channel estimation and the restarting of the process by coverage of the environment sensor system.

The channel estimation described above is particularly meaningful in the case of short range radio, such as automotive WLAN according to the IEEE 802.11/p standard, in order to achieve improvements in received power. If, in contrast, the range of wireless communication is distinctly greater than the range of the environment sensors, it must be assumed that there is no great improvement.

The invention is based especially on detecting the propagation characteristic of the wireless communication in the environment of the motor vehicle and classifying it in a simple manner in order to improve the channel estimation or the reception, respectively, on the basis of this classification.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for channel estimation for wireless communication between a motor vehicle and another communication partner, the result of an environment sensor system being used in the channel estimation, the method comprising:
   the environment sensor system detecting, at least in part by image recognition based on images from a camera, a propagation characteristic of the wireless communication in the vicinity of the motor vehicle, and classifying the propagation characteristic of the wireless communication in the vicinity of the motor vehicle, based, at least in part, on suitable features of the particular environments detected based on the image recognition;
   performing the channel estimation on the basis of the classification of the propagation characteristic; and
   adapting parameters of the channel estimation based on the classification of the propagation characteristic and/or information of the environment sensor system, the parameters including at least a factor of forgetting.

2. The method as claimed in claim 1, wherein, in the classification of the propagation characteristic, one class is selected from a plurality of predefined classifications.

3. The method as claimed in claim 1, wherein the channel estimation is restarted in the case of a change of the classification.

4. The method as claimed in claim 1, further comprising selecting a model for the channel estimation based on the classification of the propagation characteristic.

5. The method as claimed in claim 1, wherein the parameters further comprise one or more selected from the group consisting of: an intensity of reflection, an attenuation, a shading and the vehicle speed.

6. The method as claimed in claim 1, wherein the environment sensor system covers at least the environment located in the direction of movement of the motor vehicle.

7. The method as claimed in claim 1, wherein the method used in wireless communication is short range radio.

8. The method as claimed in claim 1, wherein the method for channel estimation is performed in a computing unit of a functional communication unit of the motor vehicle.

9. A functional unit of a motor vehicle comprising:
   a transmitting and receiving device for wireless communication;
   a connection to a vehicle communication network for receiving information of an environment sensor system of the motor vehicle; and
   a computing unit,
   wherein the computing unit is configured to perform the method as claimed in claim 1.

10. A non-transitory computer-readable medium storing a program for performing a channel estimation during a wireless communication between a motor vehicle and another communication partner, the program comprising code for execution in a computing unit, wherein execution of the code causes the computing unit to execute the method as claimed in claim 1.

* * * * *